United States Patent
Nagar et al.

(10) Patent No.: US 12,277,049 B2
(45) Date of Patent: Apr. 15, 2025

(54) FAULT LOCALIZATION IN A DISTRIBUTED COMPUTING SYSTEM

(71) Applicant: International Business Machines Corporation, Armonk, NY (US)

(72) Inventors: Seema Nagar, Bangalore (IN); Pooja Aggarwal, Bengaluru (IN); Qing Wang, Sunnyvale, CA (US); Larisa Shwartz, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 17/655,568

(22) Filed: Mar. 21, 2022

(65) Prior Publication Data

US 2023/0297490 A1    Sep. 21, 2023

(51) Int. Cl.
*G06F 11/3604* (2025.01)
*G06F 11/362* (2025.01)

(52) U.S. Cl.
CPC ........ *G06F 11/3612* (2013.01); *G06F 11/366* (2013.01)

(58) Field of Classification Search
CPC ................ G06F 11/3612; G06F 11/366
See application file for complete search history.

(56) References Cited

U.S. PATENT DOCUMENTS

| | | | | |
|---|---|---|---|---|
| 7,376,864 B1 * | 5/2008 | Hu | ......... | G06F 11/366 714/25 |
| 7,546,489 B2 * | 6/2009 | Gittins | ......... | G06F 11/079 714/39 |
| 7,685,574 B2 * | 3/2010 | Brumme | ......... | G06F 11/3604 717/124 |
| 7,872,982 B2 | 1/2011 | Atkins | | |
| 7,900,201 B1 | 3/2011 | Qureshi | | |
| 8,332,825 B2 * | 12/2012 | Mital | ......... | G06F 11/3612 717/124 |
| 9,772,898 B2 | 9/2017 | Deshpande | | |
| 10,185,645 B2 * | 1/2019 | Mola | ......... | G06F 11/3636 |
| 10,235,273 B2 * | 3/2019 | Mola | ......... | G06F 11/3476 |
| 11,983,094 B2 * | 5/2024 | Downie | ......... | G06F 11/3636 |
| 2005/0015668 A1 * | 1/2005 | Doyle | ......... | G06F 11/079 714/E11.026 |
| 2009/0328008 A1 * | 12/2009 | Mital | ......... | G06F 11/3612 717/129 |

(Continued)

OTHER PUBLICATIONS

Soldani et al., "Anomaly Detection and Failure Root Cause Analysis in (Micro)Service-Based Cloud Applications: A Survey", published by ACM Computing Surveys, vol. 55, Issue 3 Article No. 59, pp. 1-39, published on Feb. 3, 2022 (Year: 2022).*

(Continued)

*Primary Examiner* — S. Sough
*Assistant Examiner* — Zheng Wei
(74) *Attorney, Agent, or Firm* — Stephen R. Yoder

(57) ABSTRACT

Localizing a faulty microservice in a microservice architecture is achieved by developing healthy execution sequence data for comparison to execution sequences during system failures. Oftentimes the faulty microservice does not emit a failure signal. Frequent sub-sequences arising from log template time series data during healthy execution facilitates localization of faulty services when there is no failure signal from the faulty service.

23 Claims, 7 Drawing Sheets

(56) References Cited

U.S. PATENT DOCUMENTS

| | | | | |
|---|---|---|---|---|
| 2013/0117848 | A1* | 5/2013 | Golshan | G06F 9/45558 726/23 |
| 2016/0124823 | A1 | 5/2016 | Ruan | |
| 2016/0179600 | A1 | 6/2016 | Joshi | |
| 2017/0083390 | A1 | 3/2017 | Talwadker | |
| 2018/0349251 | A1* | 12/2018 | Mietke | G06F 11/079 |
| 2023/0057720 | A1* | 2/2023 | Aradhya | G06F 11/0709 |

OTHER PUBLICATIONS

Jia et al., "LogSed: Anomaly Diagnosis through Mining Time-weighted Control Flow Graph in Logs", published by IEEE, 2017 IEEE 10th International Conference on Cloud Computing, pp. 447-455 (Year: 2017).*

Chen et al., "CauseInfer: Automated End-to-End Performance Diagnosis with Hierarchical Causality Graph in Cloud Environment", published by IEEE, IEEE Transactions on Services Computing, vol. 12, No. 2, Mar./Apr. 2019, pp. 214-227 (Year: 2019).*

Gan et al., "Seer: Leveraging Big Data to Navigate the Complexity of Performance Debugging in Cloud Microservices", published by ACM, ASPLOS '19, Apr. 13-17, 2019, Providence, RI, USA, pp. 19-33 (Year: 2019).*

Nandi et al., "Anomaly Detection Using Program Control Flow Graph Mining from Execution Logs", pp. 215-224, published by ACM, KDD '16, Aug. 13-17, 2016, San Francisco, CA, USA (Year: 2016).*

Aggarwal et al., "Localization of Operational Faults in Cloud Applications by Mining Causal Dependencies in Logs using Golden Signals", ResearchGate, Conference Paper—Oct. 2020, 13 pages.

Disclosed Anonymously, "Failure Localization in a Distributed/Microservice Environment", An IP.com Prior Art Database Technical Disclosure, IP.com No. IPCOM000248317D, IP.com Electronic Publication Date: Nov. 15, 2016, 5 pages.

Jia et al., "An Approach for Anomaly Diagnosis Based on Hybrid Graph Model with Logs for Distributed Services", 2017 IEEE 24th International Conference on Web Services, © 2017 IEEE, 8 pages, <https://ieeexplore.ieee.org/document/8029741>.

Kim et al., "Root Cause Detection in a Service-Oriented Architecture", Sigmetrics'13, Jun. 17-21, 2013, Pittsburgh, PA, USA, Copyright 2013 ACM 978-1-4503-1900-3/13/06, 11 pages.

Mariani et al., "Localizing Faults in Cloud Systems", arXiv:1803.00356v1 [cs.SE] Mar. 1, 2018, 12 pages.

Meng et al., "Localizing Failure Root Causes in a Microservice through Causality Inference", © 2020 IEEE, 10 pages.

Nandi et al., "Anomaly Detection Using Program Control Flow Graph Mining from Execution Logs", KDD '16, Aug. 13-17, 2016, San Francisco, CA, USA, © 2016 ACM, ISBN 978-1-4503-4232-2/16/08, 11 pages.

Tak et al., "Priolog: Mining Important Logs via Temporal Analysis and Prioritization", Sustainability 2019, 11, 6306; doi:10.3390/su11226306, 17 pages, <https://www.mdpi.com/2071-1050/11/22/6306>.

Wu et al., "MicroRCA: Root Cause Localization of Performance Issues in Microservices", IEEE/IFIP Network Operations and Management Symposium (NOMS), Apr. 2020, Budapest, Hungary, hal-02441640, submitted on Jan. 16, 2020, 10 pages.

Zhou et al., "Latent Error Prediction and Fault Localization for Microservice Applications by Learning from System Trace Logs", © 2019 Association for Computing Machinery, ACM ISBN 978-1-4503-5572-08/19/08, 12 pages.

* cited by examiner

FAULT LOCALIZATION IN A DISTRIBUTED COMPUTING SYSTEM

BACKGROUND

The present invention relates generally to the field of distributed computing systems, and more particularly to fault localization.

A microservices architecture arranges applications as collections of loosely-coupled services. In a microservices architecture, services are fine-grained and the protocols are lightweight. The principle is that teams can bring their services to life independent of other teams. Loose coupling reduces all types of dependencies and the complexities around dependencies. Microservices depend on network infrastructures and oftentimes on other microservices.

Fault localization is a basic component in fault management systems because it provides an explanation for the observed network disorder(s) often related to a request failure. Fault disorders may include unreachable hosts, unreachable networks, slow response, and high utilization. Fault localization as used herein refers to locating microservice elements or components causing a fault in a microservices architecture. Locating the source of a fault in cloud applications can be a complex process due to interdependencies between applications, middleware, and/or hardware infrastructure.

SUMMARY

In one aspect of the present invention, a method, a computer program product, and a system for localizing faults includes: monitoring runtime execution of an application for an occurrence of a request failure, the application communicating with a plurality of resources within a distributed computing system; building a causal graph using erroneous logs generated during a timeframe including the request failure; identifying real-time execution sequences during the timeframe based on paths from a gateway node to a set of leaf nodes according to the causal graph; establishing a set of frequent execution sub-sequences arising during normal operation of the application based on a log template time series dataset from normal execution logs; and identifying a missing resource of the plurality of resources by analyzing a real-time execution sequence with respect to a matching frequent sub-sequence.

In another aspect of the present invention, a method, a computer program product, and a system for localizing faults includes: collecting the normal execution logs from the application associated with a plurality of resources; and generating the log template time series dataset from the normal execution logs.

In yet another aspect of the present invention, a method, a computer program product, and a system for localizing faults includes: determining a system fault has occurred in a computing system; mining normal execution sequences collected during normal operation of the computing system; building a causal graph using erroneous logs generated during the occurrence of the system fault; selecting real-time sequences from the causal graph; and identifying a missing resource in the real-time sequences by comparing the normal execution sequences to the real-time sequences.

DETAILED DESCRIPTION

Figure 1:
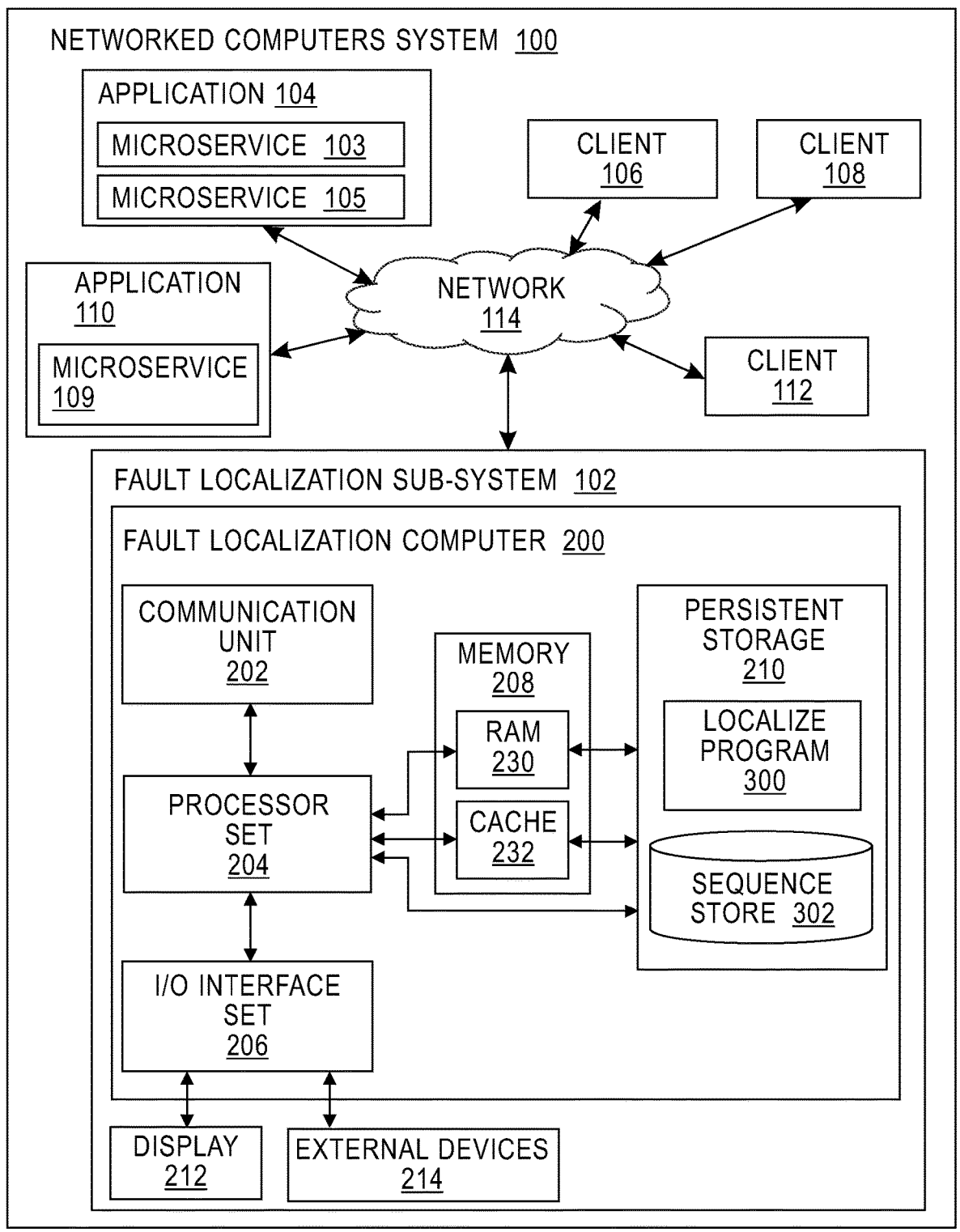
FIG. 1 is a schematic view of a first embodiment of a system according to the present invention.

Localizing a faulty microservice in a microservice architecture is achieved by developing healthy execution sequence data for comparison to execution sequences during system failures. Oftentimes the faulty microservice does not emit a failure signal. Frequent sub-sequences arising from log template time series data during healthy execution facilitates localization of faulty services when there is no failure signal from the faulty service. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: fault localization sub-system 102; application sub-systems 104, 110; microservices 103, 105, 109; client sub-systems 106, 108, 112; communication network 114; fault localization computer 200; communication unit 202; processor set 204; input/output (I/O) interface set 206; memory device 208; persistent storage device 210; display device 212; external device set 214; random access memory (RAM) devices 230; cache memory device 232; localize program 300; and execution records store 530.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Localize program 300 operates to monitor normal execution of applications to develop reference sequences of microservice interaction and dependencies for use in localizing system faults, particularly when the faulty service fails to emit error signals and/or a computing topology is not available. The localize program localized faulty services creating time-series data sets from logs generated by the application during runtime. A causality inference process may be applied to identify the faulty microservice. Additionally, the time-series data may be used to compare healthy operation sequences with faulty operation sequences to identify a missing service during faulty operation that may be triggering the fault.

Some embodiments of the present invention recognize the following facts, potential problems and/or potential areas for improvement with respect to the current state of the art: (i) failures are inevitable in distributed IT systems, especially cloud applications; (ii) IT system failures could occur for many diverse reasons including, for example (a) network cable cut, (b) upgrade of a software or hardware component, (c) memory leak, and (d) saturation in resources; (iii) a typical cloud application comprises of hundreds of microservices, interleaved to achieve the functionality; (iv) the dependencies among the microservices are complex and evolve with time; (v) an error on a microservice, propagates to many other microservices in a complex way; (vi) the microservice responsible for the failure may not emit any failure signal, such as creating an error log; (vii) existing approaches to localizing faults use a causal graph, topology graph, or dependency map, which only maps error signals to identify the erroneous microservice.

Some embodiments of the present invention are directed to localizing faults in a distributed computers system, especially cloud applications, where the system failure mode includes a faulty microservice that does not exhibit any erroneous signal.

Some embodiments of the present invention are directed to a process for localizing faults including an offline phase and a runtime phase. The offline phase may include: (i) collecting the normal execution logs from the application (comprising hundreds of microservices); (ii) converting the raw logs to log templates using an existing approach and create log template time series; (iii) building the frequent subsequences from the template timeseries using existing algorithms; and (iv) the frequent sub-sequences are further labeled with the type of execution flow they represent in a fully automated process by looking at the last template in the sequence. The runtime phase may include: (i) tracking each request so that whenever a request fails, the best matching from the learned sequences is identified; and (ii) when there is no information for each request and it is only known that a failure has occurred or will occur in the near future, there are two directions that may be taken depending on whether a topology is available.

Figure 2:
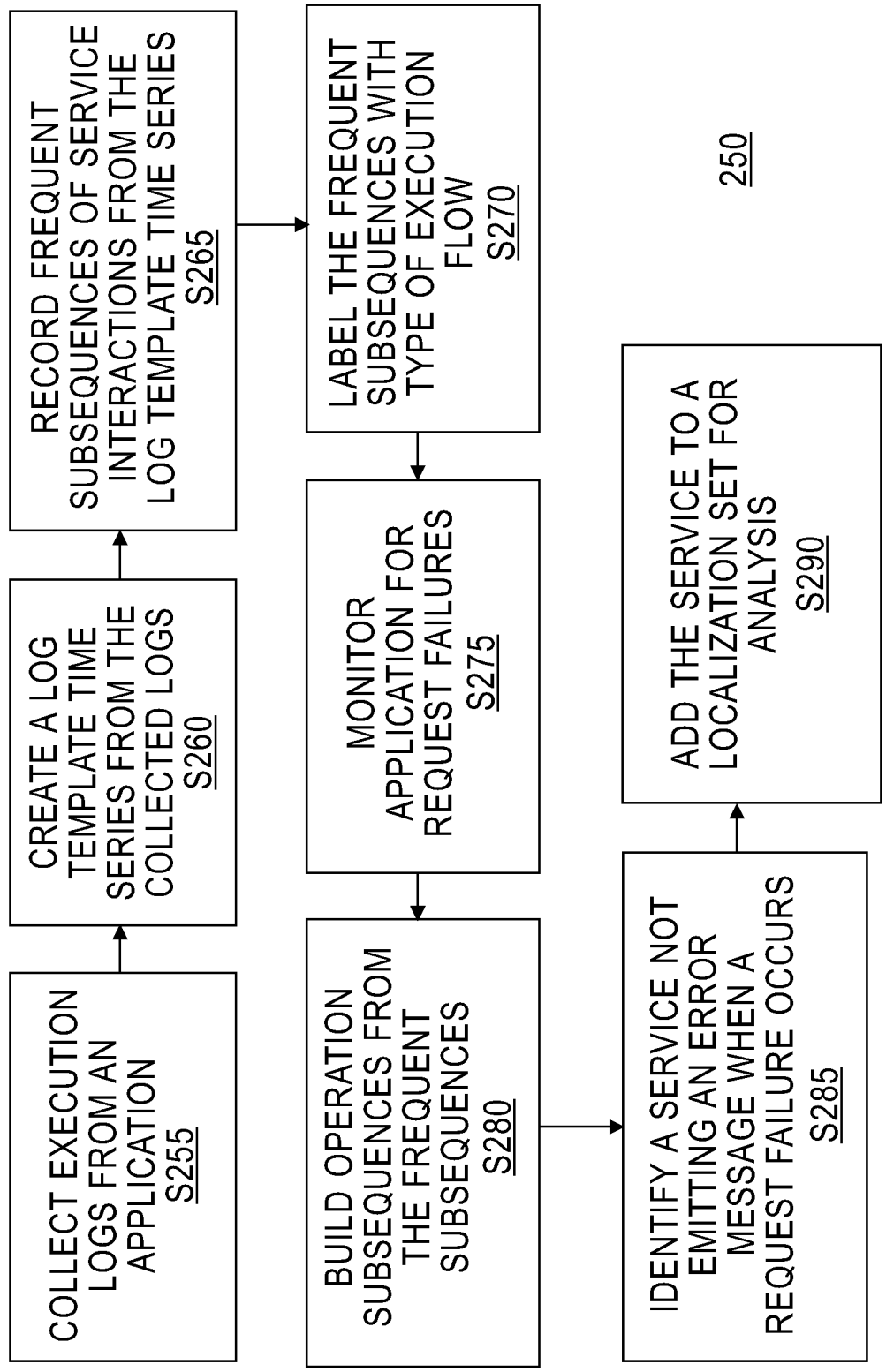
FIG. 2 is a flowchart showing a first method performed, at least in part, by the first embodiment system.
Figure 3:
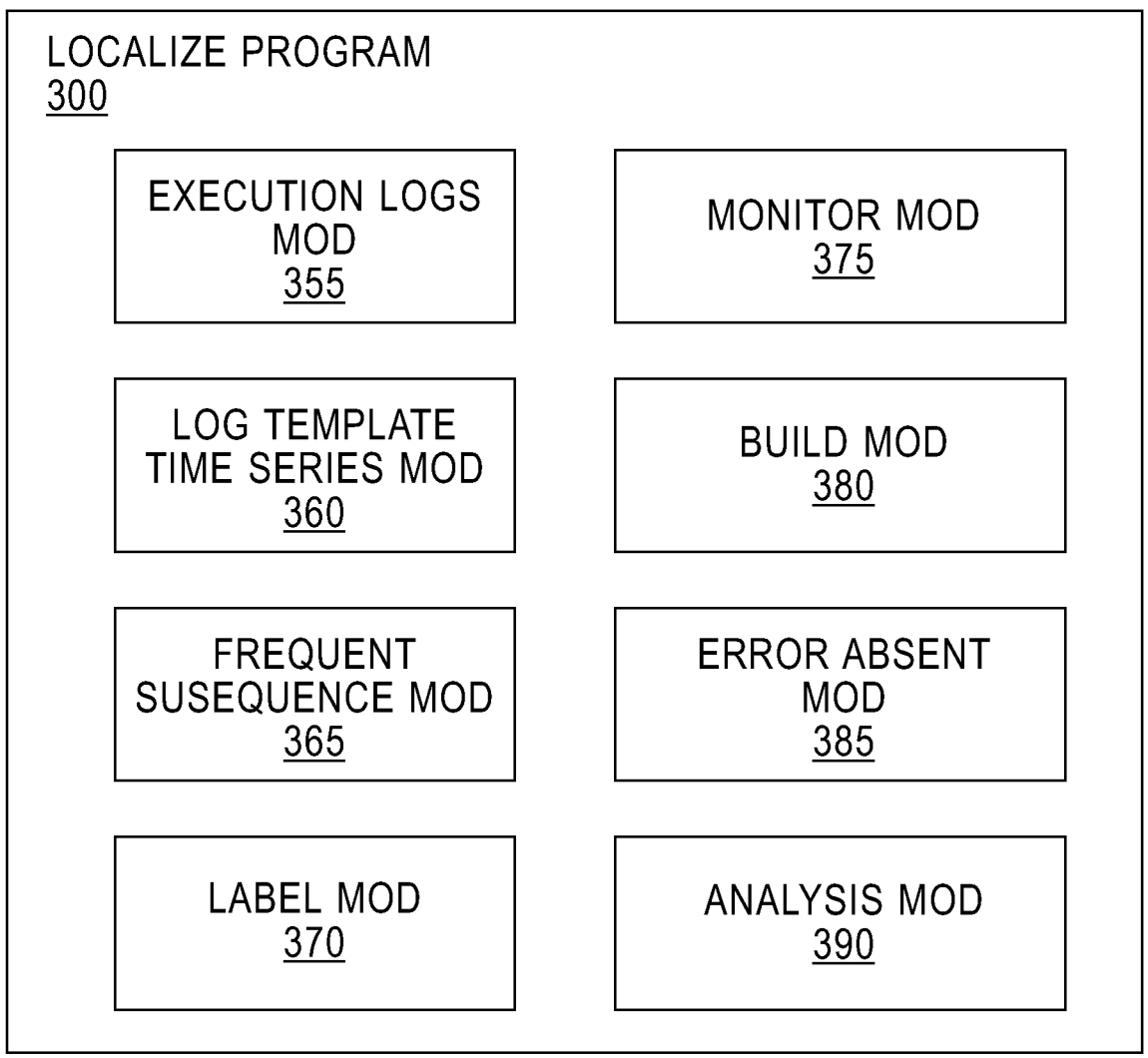
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255 where execution logs module ("mod") 355 collects execution logs from an application. In this example, Application 104 performs operations under normal, healthy conditions including using services 103 and 105 to complete certain tasks (FIG. 1). Logs are generated while the applications performs the operations. The logs are collected by the execution logs module and stored in sequence store 302. Logs contain a series of events that occurred in the system or component that wrote the logs. Logs are typically raw text files and may be in other formats including comma-separated values (csv) and JavaScript object notation (json). (Note: the term(s) "JAVA" and/or "JAVASCRIPT" may be subject to trademark rights in various jurisdictions throughout the world and are used here only in reference to the products or services properly denominated by the marks to the extent that such trademark rights may exist.)

The collection of execution logs is performed during both normal operations and when faults occur. The normal logs, as discussed herein, are processed to establish a reference for what normal execution processes look like with regard to execution flow and sequences. Collection of execution logs continues during failures, or system faults, to support fault localization processes.

According to some embodiments of the present invention, metrics are collected during system operation, similar to the collection of logs. Metrics may include periodic measurements of CPU usage, memory usage, number of requests per second, and so forth. The combination of collected logs and metrics during healthy system operations provide a useful resource for localizing faults during faulty execution, or system failures. As discuss below, these collected logs and metrics are useful in preparing a complete microservice localization set for processing including services not emitting an error signal.

Processing proceeds to step S260 where log template time series mod 360 creates a log template time series from the collected logs. In this example, the creation of log template time series data is performed as part of a training phase in which normal operations are monitored and recorded for reference during analysis of system failures. Log template time series data is created throughout operations whether during healthy execution or faulty execution. In this step, the collected "raw" logs are converted to log templates according to processes now known or to be known in the future. For example, log-template mining may be applied to the raw, unstructured logs. A log template time-series dataset may be created when the raw logs are mined for log templates. The log templates are organized into a time series dataset in support of identifying potentially missing microservices when evaluating a system fault.

Processing proceeds to step S265 where frequent subsequence mod 365 records frequent subsequences of microservice interactions from the log template time series records. By identifying frequently occurring subsequences, a system fault may be more quickly resolved than if referring only to the log templates or log template time series dataset. In this example, the frequent subsequences are recorded to sequence store 302 (FIG. 1).

Processing proceeds to step S270 where label mod 370 labels the frequent subsequences with type of execution flow. In this example, type of execution flow refers to normal and faulty execution. When the frequent subsequences are recorded, the label mod determines the type of execution flow during collection of the execution logs whether collected during normal, healthy operation or during an operation failure or system fault. According to some embodiments of the present invention, determining the type of execution flow represented by a given subsequence is performed in a fully automated process with reference to the last template in the sequence.

Processing proceeds to step S275 where monitor mod 375 monitors the application for request failures. In this example, an initial collection of normal, healthy execution data is sufficient to provide useful insights into operation subsequences so monitoring for request failures is implemented. Alternatively, throughout execution log collection and processing, the monitor mod monitors the application for request failures. By monitoring requests for failures, the monitor mod is able to promptly initiate localization processes. When request failures occur without an error message arising, monitor mod 375 initiates missing component/subservice identification. In this example, each request of the application is tracked for failure. Alternatively, monitor mod 375 observes execution flow in the system for fault disorders and triggers processing to advance to step S280 upon detection of a fault.

Upon detecting, or observing, a request failure or system fault, processing proceeds to step S280 where build mod 380 builds operations subsequences from the frequent subsequences stored and labeled in steps S265 and S270. When a request fails, the best matching execution sequence is identified from among the stored operation sequences labeled as normal, healthy system operations. According to some embodiments of the present invention, matching execution sequences is performed only when there is no evidence of the faulty component causing the request failure. Further, if evidence is available and there is no microservices topology available, causal inference techniques are used to build a causal graph from the available evidence of the faulty component and dependencies are inferred from the graph.

When no evidence of a faulty component/service is available and there is no microservices topology available, processing proceeds to step S285 where error absent mod 385 identifies a microservice not emitting an error message when the request failure is detected. The identifying process applies sequence mining techniques to the execution sequence data labeled and stored as normal execution sequences data from the log template time series data. Relevant subsequences are built based on the healthy and normal execution data. At runtime, when an error/failure has occurred, a causal graph is built using erroneous logs generated at failure. The causal graph indicates the paths from gateway node to leaf nodes so real time sequences can be obtained. By a partial matching method, the real time sequences are aligned with the learned healthy execution sequences to find a missing element in a best matching execution sequence to localize the fault to a component that may not have emitted a failure message. In this example, the sequences are built from the service level. Alternatively, the sequences are built from the template ID level for finer localization.

Processing proceeds to step S290 where analysis mod 390 adds the identified microservice to a localization set for analysis. As discussed above, the identified template ID may be added to the localization set when working at the template ID level. Missing components or services not emitting error signals may be identified according to embodiments of the present invention. Those missing components are identified and added to the localization set for localizing the system fault.

Further embodiments of the present invention are discussed in the paragraphs that follow and with reference to FIGS. 4-11.

Figure 4:
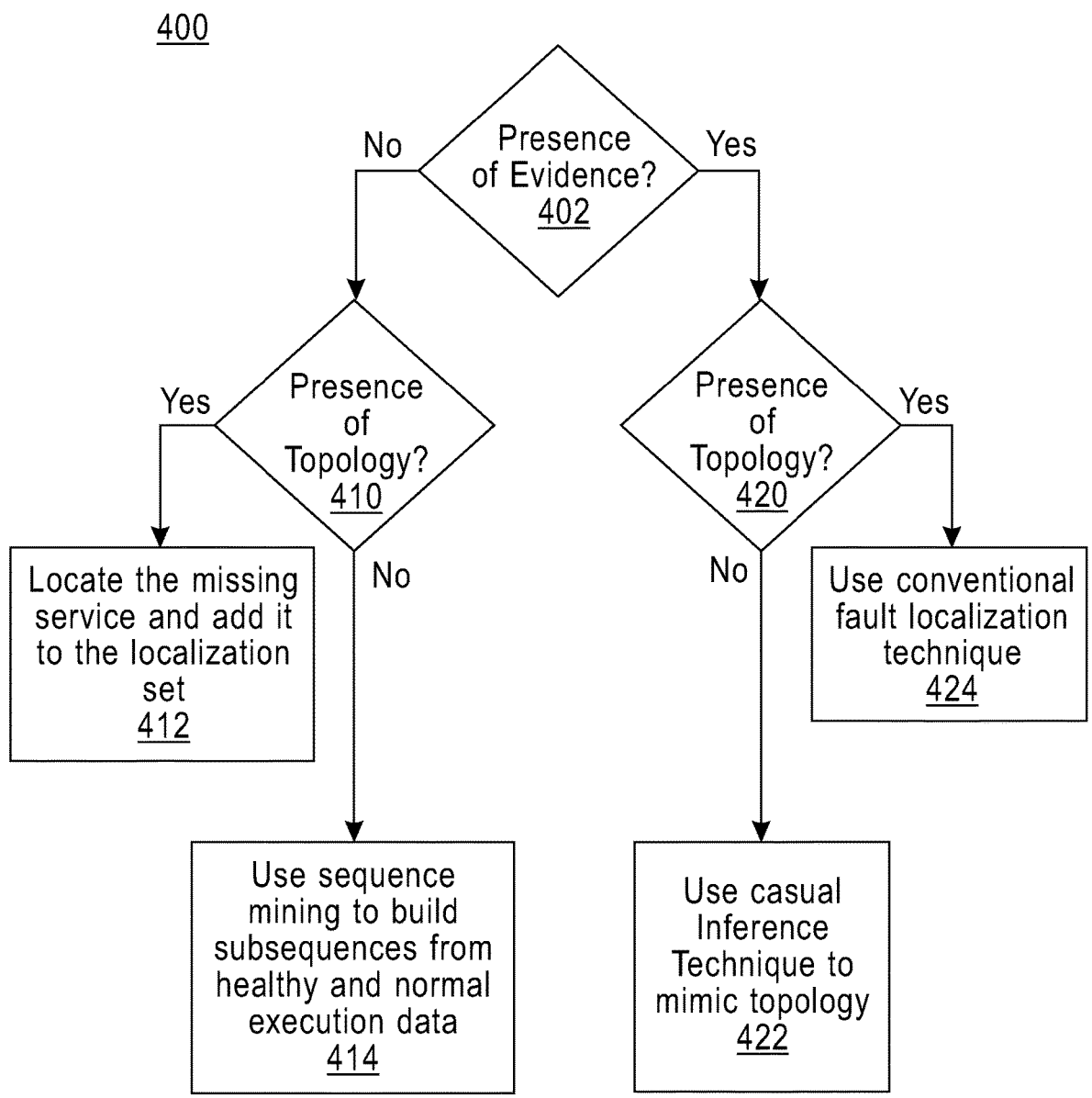
FIG. 4 is a flowchart showing a second method according the present invention.
Figure 5:
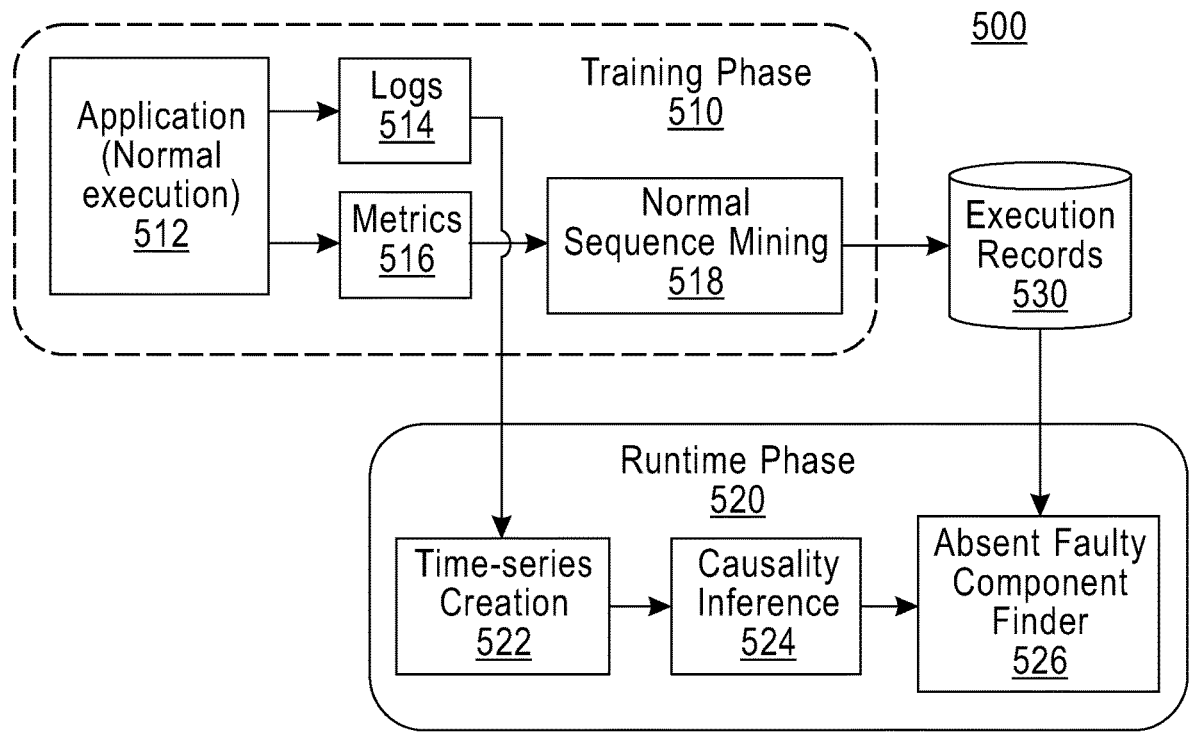
FIG. 5 is a schematic view of a machine logic (for example, software) portion for performing at least some of the second method according to the present invention.
Figure 6:
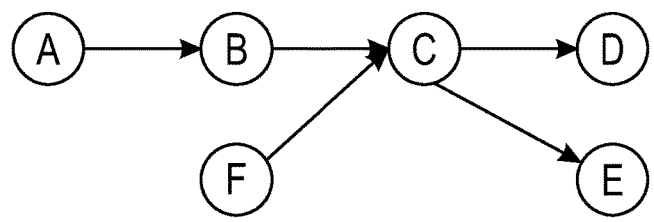
FIG. 6 is a tree diagram view showing information that is generated by and/or helpful in understanding embodiments of the present invention.

FIG. 4 shows flowchart 400 depicting a second method according to an embodiment of the present invention. FIG. 5 shows computing system 500 for performing at least some of the method steps of flowchart 400. This method and associated software will now be discussed, over the course of the following paragraphs, with extensive reference to FIG. 4 (for the method step blocks) and FIG. 5 (for the software blocks). FIG. 6 shows microservice topology 600 to aid in understanding of various embodiments of the present invention.

Processing begins at decision step 402, where the system determines whether there is evidence of a faulty microservice component. When a processing fault occurs, the system identifies any evidence of the faulty component responsible for the fault. If evidence of the faulty component is available, processing follows the "Yes" branch to decision step 420. When no evidence is available, processing follows the "No" branch to decision step 410. Both steps 410 and 420 make a decision based on the same question, "is there a microservices topology available?"

If a microservices topology is available for a fault having evidence of the faulty component, conventional fault localization tools may be used (424), following the "Yes" branch from step 420. If the microservice topology is available but the fault is not supported by evidence of the faulty component, processing follows the "Yes" branch from step 410 to step 412.

Following the "Yes" branch from step 410 to step 412, the system locates the missing service and adds it to the localization set. In this step, the system uses the "neighborhood" to look for the missing service that is faulty but not reporting an error. As shown in FIG. 6, microservices topology 600 includes six microservices, A, B, C, D, E, and F. As shown, Service A depends on Service B, Services B and F depend on Service C, and Service C depends on Services D and E. If Services A, B, and F are emitting errors, Service C may be included in the localization set because each of the services depending on Care emitting error messages. Also, if Services A and B are emitting errors, Service C may be included in the localization set because two of the three services depending on C are emitting error messages.

If a fraction of the services depending on a given service are emitting error message while the given service is showing no error symptom, including the given service in the localization set may support localization of the faulty service. A conventional approach to localization may be employed once the localization set is completed in this manner. Additionally, a threshold value of the effective fraction of the dependent services may be computed with reference to execution sequences mined by normal sequence mining module 528 from healthy execution processes by training phase 510 and stored in execution records 530. As shown in FIG. 5, the logs 514 and metrics 516 are collected from normal execution processes of application 512 for sequence mining and sequence storage.

If a microservices topology not available for a fault having evidence of the faulty component, processing follows the "No" branch from step 420. If the microservice topology is not available and the fault is not supported by evidence of the faulty component, processing follows the "No" branch from step 414.

Following the "No" branch from step 420 to step 422, where the system uses causal inference techniques to mimic topology followed by use of conventional techniques for fault localization. In this example, causal inference is performed by causality inference module 524 within runtime phase operations 520. Causal inference techniques are used to build a causal graph from the available execution evidence. Dependencies are inferred with reference to the causal graph to create dependency graph. Upon creation of the dependency graph, conventional approaches to localization may be employed.

Following the "No" branch from step 410 to step 414, where the system uses sequence mining to build sub-sequences from healthy and normal execution data. The logs and metrics collected during operations are flagged as being collected during normal, healthy system/application performance or during failure of the system or application. At run time, when an error or failure occurs, a causal graph is built using erroneous logs. The paths in the causal graph from gateway node to leaf nodes are processed to get real-time execution sequences. The real-time execution sequences are aligned with learned execution sequences of normally functioning and healthy execution of the corresponding application to find missing elements of a best-matching sequence of the real-time execution sequences to localize faults. In this example, execution data is collected from normally functioning application 512. The execution data is collected by logs module 514 and metrics module 516. Healthy execution sequences are collected as part of the training phase subsystem 510 and stored in execution records 530 as normal or healthy execution sequences.

In step 414, sequence mining is applied to the healthy execution sequences to build sub-sequences. The sub-sequences may be built either at the template IDs level or at the microservice, or application, level. By using a process of partial matching, the best-matching healthy sequences are identified with respect to the set of real-time execution sequences. Missing elements are identified by determining which elements in the best-matching healthy sequences are not present in the corresponding real-time execution sequences including faulty execution sequences. Absent faulty component finder module 526 performs missing elements identification during the runtime phase 520. The identified missing elements are evaluated for being faulty components.

It is noted that when there is an absence of both healthy execution data and error messages from a faulty service, an available microservices topology may be used to support identification of the faulty component, or element, similar to the process described in step 412 where the system uses the "neighborhood" to look for the missing service that is faulty but not reporting an error. Further, in the absence of healthy execution data, when a microservice topology is not available, the process described in step 414 may also be applicable for identifying a faulty element.

Referring again to FIG. 5, system 500 is a computing system for performing steps for mining execution sequences from normal, or healthy, execution data according to some embodiments of the present invention. Data collected during normal execution of application 512 is processed by logs module 514 and metrics module 516. The collected logs and metrics are assigned individual timestamps. The logs module translates collected logs data into templates according to conventional techniques such as regular expressions can be used. The logs module also assigns time windows to the logs templates for time-series creation mod 522 to generate a time-series of data as a runtime phase operation 420. Normal sequence mining module 518 uses the time windows to apply suitable sequence mining techniques on the log template time series.

Similar to the treatment of the log data, metrics module 516 converts collected metrics data into categorical values. For example, the metrics value CPU utilization may be converted to high, medium, and low categorical consumption. The metrics module also assigns time windows to the metrics to generate a time-series of data. Normal sequence mining module 518 uses the time windows to apply suitable sequence mining techniques on the metrics categorical value time series.

Figure 7:
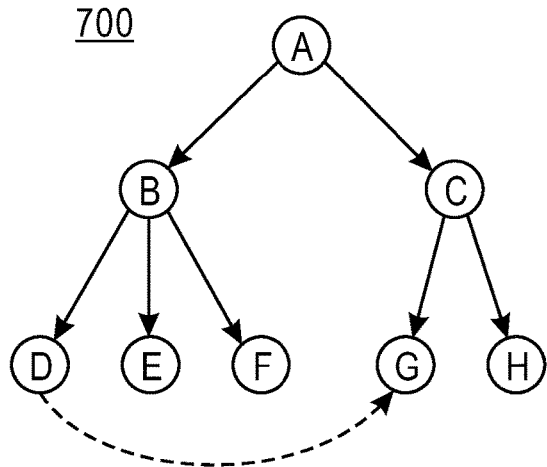
FIG. 7 is a tree diagram view showing information that is generated by and/or helpful in understanding embodiments of the present invention.

FIG. 7 shows topology 700 for microservices as an aid to understanding embodiments of the present invention. The topology includes nodes A, B, C, D, E, F, G, and H. For a given microservice topology such as topology 700 where nodes represent microservices, the expression $\{e_i^1, e_i^2, \ldots, e_i^{|T|}\}$ represents the normal executions on microservice i in operations set [1, 2, ..., T]. Frequent service patterns are learned from historical normal execution records.

Figure 8:
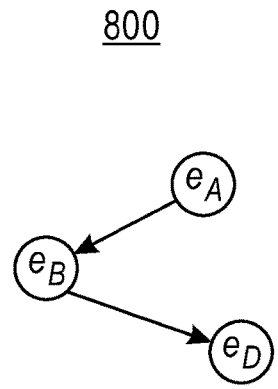
FIG. 8 is a tree diagram view showing information that is generated by and/or helpful in understanding embodiments of the present invention.

FIG. 8 shows subgraph 800 from topology 700 as an example frequent subgraph according to an embodiment of the present invention. In this example, a frequent execution sequence includes an execution order from A to B to D. Frequent patterns of events from cross nodes are discovered by mining engines such as normal sequence mining module 518 (FIG. 5). Apriori-based subgraph frequent pattern mining algorithms are used to discover the frequent patterns of events in the topology, such as execution sequence with nodes A, B, and D. The frequent execution sequence patterns are stored in a database, such as execution records store 530, as normal execution patterns, e.g. $\{\{p_1: \text{frequencts}\}, \ldots, \{p_n: \text{frequents}\}\}$.

Apriori is an algorithm for frequent item set mining and association rule learning over relational databases. It proceeds by identifying the frequent individual items in the database and extending them to larger and larger item sets as long as those item sets appear sufficiently often in the database. The frequent item sets determined by Apriori can be used to determine association rules which highlight general trends in a database.

Figure 9:
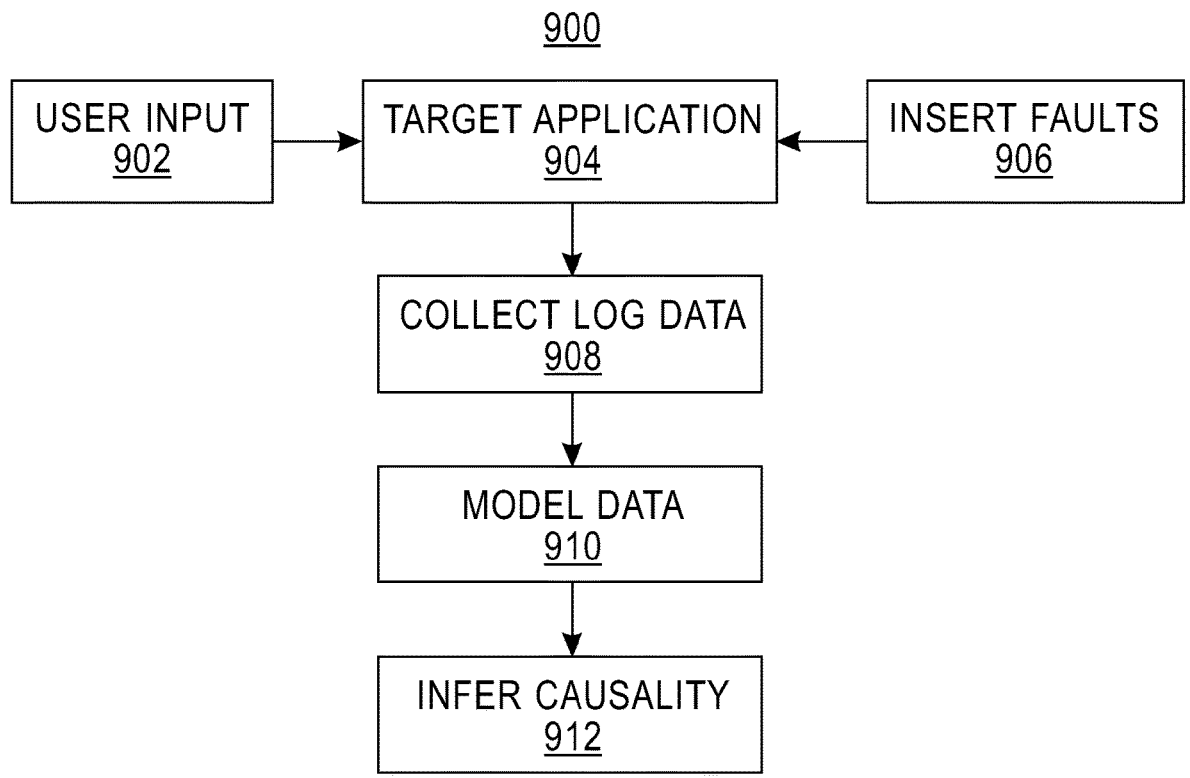
FIG. 9 is a flowchart showing a third method according to the present invention.

FIG. 9 shows flowchart 900 depicting a process for inferring causality according to an embodiment of the present invention. Flowchart 900 presents a process for, at runtime, uses logs and metrics data to figure out which component, or element, among a set of microservices is a faulty component.

During runtime of target application 904, user input module 902 provides for user input to operate the application. Error logs are collected by injecting faults (906) into certain microservices. When a fault is inserted into the process and is detected, collect log data module 908 collects relevant data moments before the failure as well as moments after the failure. According to some embodiments of the present invention, data is collected for a three to six-minute window capturing logs and metrics both before and after the failure is detected.

Model data module 910 receives the collected log data and identifies a suitable bin for creating/storing multi-variate time series templates for various types of execution flows. The number of templates for each type is counted for each bin. Infer causality module 912 uses the multi-variate time series to create a causal dependency graph at the template and/or component level. The causal dependency graph provides for finding various paths from the nodes having a zero indegree to the nodes having a zero outdegree. The found paths are reversed to create execution sequences. The created execution sequences may be compared to normal execution sequences collected during normal operation to find the missing component responsible for the application fault.

Figure 10:
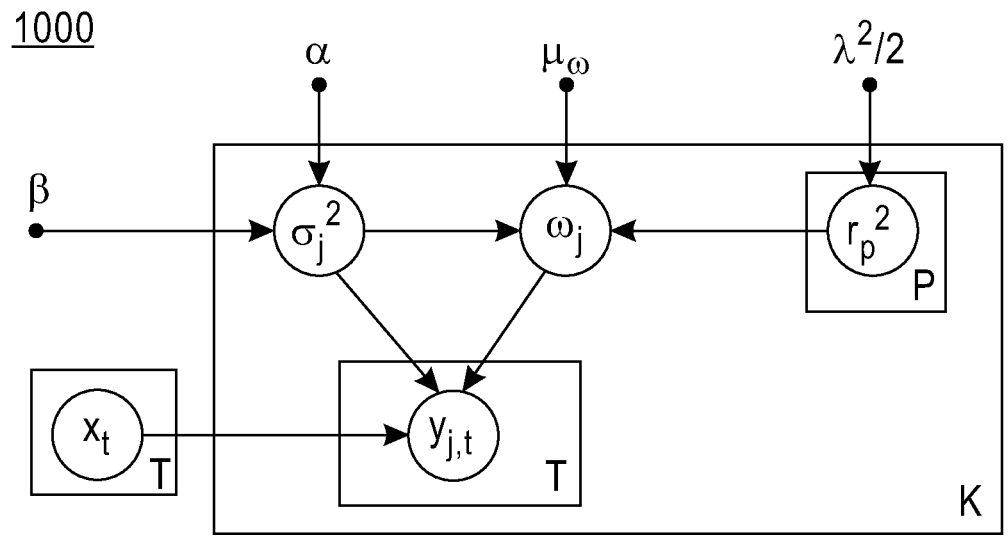
FIG. 10 is a data structure view showing information that is generated by and/or helpful in understanding embodiments of the present invention.

FIG. 10 shows Bayesian Lasso model 1000 of the equivalent form for mining causality at runtime according to an embodiment of the present invention.

Using LASSO (Least Absolute Shrinkage and Selection Operator) regression for mining causality at runtime. The LASSO regression is performed as follows:

$$\text{Min} W_j = \sum_{t=L+1}^{T} (y_{j,t} - w_j^T x_t)^2 + \lambda \|w_j\|_1,$$

for the term $y_{j,t}|w_j$, $\sigma_j^2 \sim N(w_j^T x_t, \sigma_j^2)$, the Laplace distribution is as follows:

$$\pi(w_j|\sigma_j^2) = \prod_{p=1}^{P} \frac{\lambda}{2\sqrt{\sigma^2}} e^{-\lambda |w_{j,p}|/\sqrt{\sigma^2}},$$

and is equivalent to the following:

$w_j|\sigma_j^2, \gamma_1^2, \ldots, \gamma_P^2 \sim N(\mu_w, \sigma_j^2 R_{w_j})$, $\sigma_j^2 \sim IG(\alpha, \beta)$, $\gamma_p^2 \sim \text{Exp}(\lambda^2/2)$, $1 \le p \le P$.

$R_{w_j} = \text{diag}(\gamma_1^2, \ldots, \gamma_P^2)$.

Some embodiments of the present invention are directed to finding a missing component for fault localization when the faulty component is not reporting an error message. The following process recognizes that the error propagation mined through causal inference would be in the reverse direction of the direction in which the request flows. For execution sequence $S_1, S_2, \ldots, S_i$ learned during normal execution at the service level and an error propagation learnt through causal inference being $S_{(i-1)}, S_{\{i-2\}}, \ldots, S_1$. The reverse of the causal sequence is $S_1, S_2, \ldots, S_{\{i-1\}}$. By comparing both execution sequences, it may be found that $S_i$ is not emitting any error message, so $S_i$ and $S_{\{i-1\}}$ are set as candidate faulty services. Upon identifying the candidate services, a search is performed for healthy messages being emitted during runtime by the candidate services. By processing the comparison data, searching for healthy messages, and analyzing an error message emitted by $S_{\{i-1\}}$, the fault can be localized to the correct component, $S_i$. Similar processing may be performed at the template level for improved localization.

Figure 11:
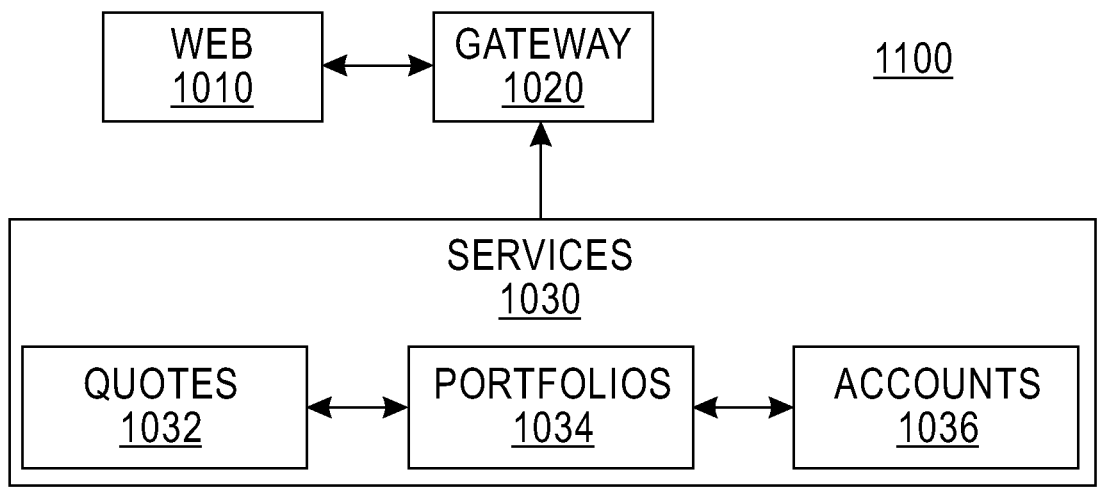
FIG. 11 is a schematic view showing information that is generated by and/or helpful in understanding embodiments of the present invention.

FIG. 11 shows data structure 1100 as an aid in understanding embodiments of the present invention. Services system 1030 includes microservices Quotes 1032, Portfolios 1034, and Accounts 1036. These services communicate to Web 1010 via Gateway 1020. For a fault inserted at microservice Quotes 1036, the paths of error propagation may be one of the following:

| | |
|---|---|
| Quotes=>Gateway=>Web | (1), |
| Quotes=>Portfolios=>Gateway=>Web | (2), or |
| Quotes=>Portfolios=>Accounts=>Gateway=>Web | (3). |

The observed error logs only show error messages generated from Quotes 1032, Gateway 1020, and Web 1010. In this example, frequent execution sequency data from healthy executions stored in a healthy execution records database, such as execution records store 530, includes the frequent execution path "Quotes=>Portfolios=>Gateway=>Web." It may be inferred from the frequent execution path that Portfolios 1034 is the missing component causing the fault. Upon examination it may be found that the microservice Portfolios is already shut down.

Some embodiments of the present invention are directed to a method to localize faults in a distributed system, especially cloud applications, in the system failure scenarios where the faulty microservice is not exhibiting any erroneous signal. The method may include: (i) collecting the normal execution logs from the application (comprising of hundreds of microservices); (ii) converting the raw logs to log templates using an existing approach and create log template time series; (iii) building the frequent subsequences from the template timeseries using existing algorithms; (iv) wherein the frequent subsequences are further labeled with the type of execution flow they represent (this is a fully automated step that is done by looking at the last template in the sequence); (v) tracking each request and finding the best matching from the learned sequences, whenever a request fails; (vi) in case of absence of error messages from faulty service and topology is available, then if a fraction of the services depending on a service are emitting errors while it is showing no error symptom, including the service in localization set and using existing approach; (vii) in case of absence of error messages from faulty service and topology is not available, using sequence mining to build sub-sequences or signatures from healthy/normal executions and at run time, when an error/failure has occurred, building causal graph using erroneous logs (a) using the paths in the causal graph from gateway node to leaf nodes to get real time sequences and using partial matching. (b) finding the best matching sequence from the learned normal sequences to the real time sequences; and (c)) finding out partial matches that are not complete matches and finding the missing element in the best matching sequence to localize faults; and/or (viii) in presence of error messages and topology is not available, (a) using causal inference technique to build causal graph, (b) using the causal graph to infer dependency graph, and (c) using existing techniques for fault localization.

Some embodiments of the present invention are directed to converting raw error logs to log templates and creating log template time series from the data.

Some embodiments of the present invention may include one, or more, of the following features, characteristics and/or advantages: (i) supports localizing faults when the faulty service is not emitting any error signals.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for localizing faults, the method comprising:

monitoring, during runtime execution of an application, for an occurrence of a request failure by tracking requests of the application for a failure, the application communicating with a plurality of resources within a distributed computing system;

identifying a timeframe in which a request failure is observed while tracking requests of the application;

building a causal graph using erroneous logs generated during the timeframe when the request failure is observed;

identifying real-time execution sequences during the timeframe of the request failure based on paths from a gateway node to a set of leaf nodes according to the causal graph;

establishing a set of frequent execution sub-sequences arising during normal operation of the application including communications with the plurality of resources, the establishing based on a log template time series dataset from normal execution logs; and identifying a missing resource of the plurality of resources by analyzing a candidate execution sequence occurring during the timeframe with respect to a corresponding partially matching frequent execution sub-sequence of the set of frequent execution sub-sequences, the missing resource being present in the corresponding partially matching frequent execution sub-sequence and absent from the candidate execution sequence.

2. The method of claim 1, further comprising:

collecting the normal execution logs from the application associated with the plurality of resources; and generating the log template time series dataset from the normal execution logs.

3. The method of claim 1, wherein identifying the missing resource includes:

comparing the real-time execution sequences to the set of frequent sub-sequences arising during normal execution to identify the candidate execution sequence and the corresponding partially matching frequent execution sequence.

4. The method of claim 1, wherein the set of frequent sub-sequences are labeled individually with a corresponding type of execution flow.

5. The method of claim 1, wherein the missing resource is a faulty microservice.

6. The method of claim 1, wherein:
there is no microservice topology available; and
the missing resource does not emit an error signal during the timeframe.

7. The method of claim 1, further comprising:
evaluating the missing resource for being a faulty component of the distributed computing system.

8. The method of claim 1, wherein the set of frequent execution sub-sequences are discovered by apriori-based subgraph frequent pattern mining algorithms, each frequent execution sub-sequence developed from frequently arising individual items and extended to larger item sets having a threshold minimum frequency, the larger item sets being designated frequent execution sub-sequences.

9. A computer program product comprising a computer-readable storage medium having a set of instructions stored therein which, when executed by a processor, causes the processor to localize faults by:
monitoring, during runtime execution of an application, for an occurrence of a request failure by tracking requests of the application for a failure, the application communicating with a plurality of resources within a distributed computing system;
identifying a timeframe in which a request failure is observed while tracking requests of the application;
building a causal graph using erroneous logs generated during the timeframe when the request failure is observed;
identifying real-time execution sequences during the timeframe of the request failure based on paths from a gateway node to a set of leaf nodes according to the causal graph;
establishing a set of frequent execution sub-sequences arising during normal operation of the application including communications with the plurality of resources, the establishing based on a log template time series dataset from normal execution logs; and
identifying a missing resource of the plurality of resources by analyzing a candidate execution sequence occurring during the timeframe with respect to a corresponding partially matching frequent execution sub-sequence of the set of frequent execution sub-sequences, the missing resource being present in the corresponding partially matching frequent execution sub-sequence and absent from the candidate execution sequence.

10. The computer program product of claim 9, further causing the processor set to localize faults by:
collecting the normal execution logs from the application associated with the plurality of resources; and
generating the log template time series dataset from the normal execution logs.

11. The computer program product of claim 9, wherein identifying the missing resource includes:
comparing the real-time execution sequences to the set of frequent sub-sequences arising during normal execution to identify the candidate execution sequence and the corresponding partially matching frequent execution sequence.

12. The computer program product of claim 9, wherein the resources include microservices.

13. The computer program product of claim 9, wherein the set of frequent sub-sequences are labeled individually with a corresponding type of execution flow.

14. A computer system for localizing faults, the computer system comprising:
a processor set; and
a computer readable storage medium having program instructions stored therein;
wherein:
the processor set executes the program instructions that cause the processor set to localize faults by:
monitoring, during runtime execution of an application, for an occurrence of a request failure by tracking requests of the application for a failure, the application communicating with a plurality of resources within a distributed computing system;
identifying a timeframe in which a request failure is observed while tracking requests of the application;
building a causal graph using erroneous logs generated during the timeframe when the request failure is observed;
identifying real-time execution sequences during the timeframe of the request failure based on paths from a gateway node to a set of leaf nodes according to the causal graph;
establishing a set of frequent execution sub-sequences arising during normal operation of the application including communications with the plurality of resources, the establishing based on a log template time series dataset from normal execution logs; and
identifying a missing resource of the plurality of resources by analyzing a candidate execution sequence occurring during the timeframe with respect to a corresponding partially matching frequent execution sub-sequence of the set of frequent execution sub-sequences, the missing resource being present in the corresponding partially matching frequent execution sub-sequence and absent from the candidate execution sequence.

15. The computer system of claim 14, further causing the processor set to localize faults by:
collecting the normal execution logs from the application associated with the plurality of resources; and
generating the log template time series dataset from the normal execution logs.

16. The computer system of claim 14, wherein identifying the missing resource includes:
comparing the real-time execution sequences to the set of frequent sub-sequences arising during normal execution to identify the candidate execution sequence and the corresponding partially matching frequent execution sequence.

17. The computer system of claim 14, wherein the resources include microservices.

18. The computer system of claim 14, wherein the set of frequent sub-sequences are labeled individually with a corresponding type of execution flow.

19. The computer system of claim 14, wherein the missing resource is a faulty microservice.

20. A computer-implemented method comprising:
determining a request failure has occurred in a computing system by tracking requests of an application for a failure;
mining normal execution sequences collected during normal operation of the computing system;

generating a log-template timeseries dataset from the normal execution sequences;

identifying a set of frequently-arising sub-sequences based on the log-template timeseries dataset;

building a causal graph using erroneous logs generated in real time during the occurrence of the system fault;

selecting a candidate real-time sequence from the causal graph, the selected candidate real-time sequence partially matching a frequently-arising sub-sequence of the identified frequently-arising sub-sequences; and identifying a missing resource in the candidate real-time sequence by comparing the partially matching frequently-arising sub-sequence to the candidate real-time sequence, the missing resource being present in the frequently-arising sub-sequence and absent from the candidate real-time sequence.

21. The method of claim 20, further comprising:

individually labeling the set of frequently-arising sub-sequences based on corresponding types of execution flows represented by the each frequently-arising sub-sequence.

22. The method of claim 20, wherein the step of mining normal execution sequences is performed automatically in response to determining a request failure.

23. The method of claim 20, further comprising:

adding the missing resource to a localization set for system fault resolution.

* * * * *